United States Patent [19]

Duncombe et al.

[11] Patent Number: 4,527,955
[45] Date of Patent: Jul. 9, 1985

[54] ELECTROMAGNETIC PUMPS OF THE HELICAL LINEAR INDUCTION TYPE

[75] Inventors: Edward Duncombe, Altrincham; Gordon Thatcher, Lymm, both of England

[73] Assignee: United Kingdom Atomic Energy Authority, London, England

[21] Appl. No.: 449,527

[22] Filed: Dec. 13, 1982

[30] Foreign Application Priority Data

Jan. 8, 1982 [GB] United Kingdom ................ 8200561

[51] Int. Cl.³ ........................................... H02K 44/02
[52] U.S. Cl. ...................................... 417/50; 376/253
[58] Field of Search ............................. 417/50; 310/11; 376/253

[56] References Cited

U.S. PATENT DOCUMENTS

| 2,770,196 | 11/1956 | Watt | 417/50 |
|---|---|---|---|
| 2,786,416 | 3/1957 | Fenemore | 310/11 X |
| 3,251,302 | 5/1966 | Baker | 417/50 |
| 3,302,573 | 2/1967 | Ledeen | 417/50 |
| 3,885,890 | 5/1975 | Davidson | 417/50 |
| 4,166,714 | 9/1979 | Rienass et al. | 417/50 |
| 4,174,190 | 11/1979 | Craig et al. | 417/50 |
| 4,177,015 | 12/1979 | Davidson | 417/50 |
| 4,412,785 | 11/1983 | Roman | 417/50 |

FOREIGN PATENT DOCUMENTS 738764 10/1955 United Kingdom ................ 417/50

Primary Examiner—Edward K. Look
Assistant Examiner—Paul F. Neils
Attorney, Agent, or Firm—William R. Hinds

[57] ABSTRACT

An electromagnetic pump of the helical annular linear induction type has pumped flow along paths which lie both inside and outside pipes (21) passing through the pump annulus (14). The pipes may be sampling pipes of failed fuel element detection apparatus. A number of pumps according to the invention may be arranged in cascade with selected pipes passing in series through selected combinations of pumps in the cascade so that, with an appropriate energization of selected pumps, flow along one pipe can be created while flow along other pipes is prevented.

3 Claims, 2 Drawing Figures

ELECTROMAGNETIC PUMPS OF THE HELICAL LINEAR INDUCTION TYPE

CROSS REFERENCE TO RELATED APPLICATIONS

Application Ser. No. 449,526, claiming priority from GB No. 82 00593 of Jan. 8, 1982, filed by the present applicants.

BACKGROUND OF THE INVENTION

This invention relates to electromagnetic pumps of the type known as the "helical annular linear induction pump", abbreviated as HALIP. Such pumps are disclosed for example in GB No. 730,943 and GB No. 1,143,304.

Pumps according to the invention have an application in conjunction with apparatus for testing for the occurrence of sheathing failures in fuel pins of nuclear reactors cooled by liquid metal, sometimes referred to as "Failed Fuel Detection Apparatus".

The general approach to the subject of failed fuel detection in liquid metal cooled fast reactors has been to use one coolant sampling pipe for each assembly of fuel to be tested. The pipes are terminated at respective ports of a multi-port selection valve having a rotating arm with a rubbing seal which selects for measurement in sequence the coolant appearing at the ports in the valve. GB No. 1,287,536 exemplifies this approach. Wear, sealing and maintenance problems can arise.

FEATURES AND ASPECTS OF THE INVENTION

The present invention provides a new form of HALIP which has one significant use in failed fuel detection apparatus in liquid metal cooled fast reactors.

The HALIP according to the present invention is characterised in that it is constructed for pumped flow along paths which lie both inside and outside pipes passing through the pump annulus.

DESCRIPTION OF THE DRAWINGS

A pump according to the present invention will now be described with references to the accompanying drawings in which.

DESCRIPTION OF THE PREFERRED EMBODIMENTS

Figure 1:
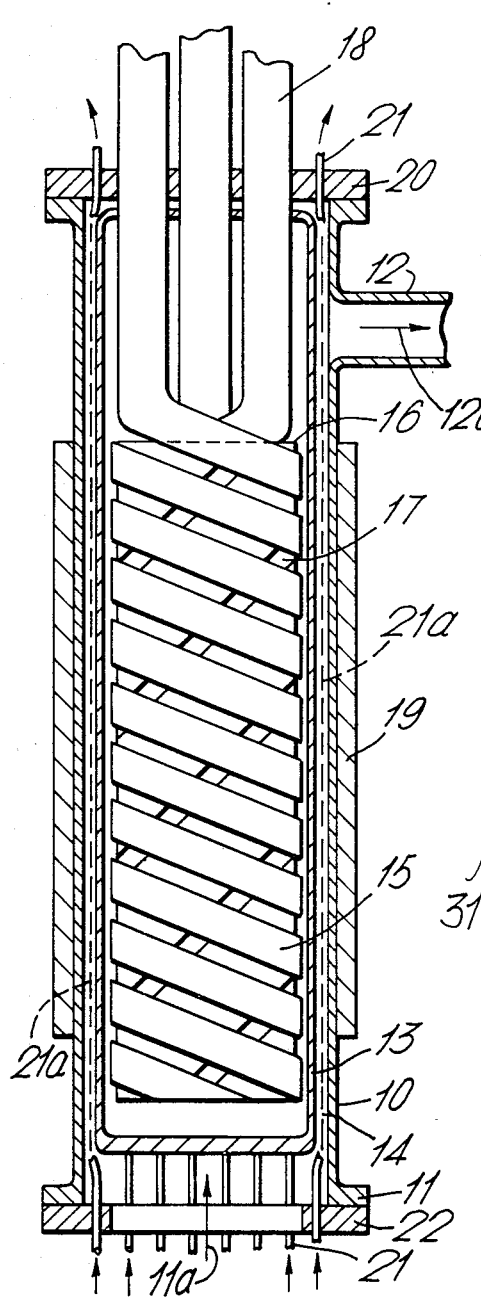
FIG. 1 shows in section a pump according to the invention.

In FIG. 1 an outer casing 10 has an inlet flange 11 and an outlet duct 12.

There is a thimble 13 in the casing 10 and a gap between thimble 13 and casing 10 provides an annular flow passage or annulus 14 through which liquid metal from the inlet 11 can be pumped (arrow 11a) to discharge (arrow 12a) at the outlet 12. Within the thimble 13 there is a three-phase helical winding 15 wound round a central iron core 16 with helical slots 17. Connectors 18 supply power to the winding 15. An iron stator 19 is provided outside the casing 10. The casing 10 is closed by a top plate 20.

Sampling pipes 21 pass through a lower ring 22 secured to flange 11 and then traverse the annular flow passage 14. (This is indicated by the dash lines 21a passing along the annulus). The pipes, after leaving the annular flow passage 14, pass through the plate 20. The pipes are straight. They could be helical to give a nominal improvement in efficiency but the increased complexity and cost is probably not justified.

The pipes 21 are typically of a thin gauge stainless steel selected so that the pipes become wetted internally with sampled liquid metal and externally with liquid metal passing through the pump. The wetting ensures satisfactory electrical performance of the pump and at the same time ensures temperature stabilisation of liquid metal inside the pipes 21 by virtue of liquid metal passing over the outside of the pipes. This can avoid overheating as may arise when flow in the pipes is arrested.

One use of pumps as shown in FIG. 1 will now be described with reference to FIG. 2.

Figure 2:
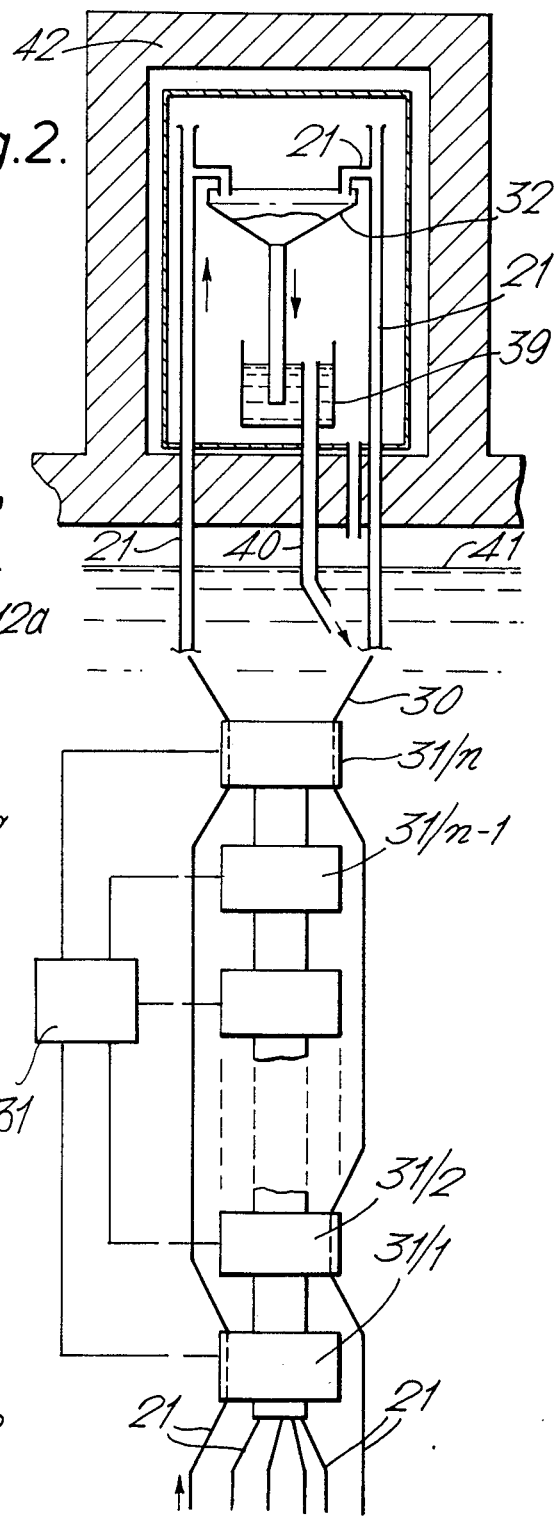
FIG. 2 shows diagrammatically the operation of a number of such pumps for failed fuel element detection.

In FIG. 2 a number of sampling pipes 21 are shown connected with a vertical cascade of immersed pumps (as above described with reference to FIG. 1) numbered 31/1; 31/2; 31/n in a pool of liquid metal represented by level 41. Each pipe 21 traverses selected pumps and by-passes the remainder. For example, the left-most pipe 21 in FIG. 2 traverses pumps 31/1 and 31/n. The right-most pipe 21 traverses pump 31/2 and 31/n. It is possible for the pipes 21 to each traverese more than two pumps in the cascade. A table can be drawn up, as indicated below, which relates to number (N) of pipes 21 which can be sampled for a given total number (n) of pumps assuming there are (r) pumps traversed by each pipe 21.

| Number of pumps (n) | Number of Pipes 21 which can be sampled (N) | | |
|---|---|---|---|
| | r = 1 | r = 2 | r = 3 |
| 8 | 8 | 28 | 56 |
| 9 | 9 | 36 | 84 |
| 10 | 10 | 45 | 120 |
| 11 | 11 | 56 | 165 |
| 12 | 12 | 66 | 220 |
| 13 | 13 | 78 | 286 |
| 14 | 14 | 91 | 364 |

The pipes 21 discharge into a tundish 32 which feeds to a sample collecting pot 39 with an overflow 40. It is observed that the head against which pumping takes place in the pipes 21 is greater than that presented by level 41. The use of a tundish avoids any risk of reverse flow. Shielding 42 is provided. Samples in the pot 39 can be tested for products indicative of coolant flow in pipes 21 from failed nuclear fuel. A control box 31 is provided to control energization of the pumps.

In use of the apparatus described with reference to FIG. 2, it is arranged that the head of liquid where a pipe 21 is discharging into the tundish 32 can only be sustained when the appropriate number of pumps 31 are energised. Thus in a system in which two pumps are traversed by each pipe 21 the head is such that a single pump cannot sustain it. Accordingly, by making an appropriate selection of two pumps a selected pipe 21 can be made to discharge into the tundish 32. Alternatively, pumps can be "reversed" energised to ensure that flow does not occur in a pipe 21 which it is not required to sample.

The energisation of the pumps can be brought about by solid-state switching and mechanical operation, with its attendant wear, sealing and maintenance problems, is avoided. It is possible to energise all pumps to give a bulk flow and then, should a failed fuel pin be detected, a search programme can be initiated in which a bulk sample from half of the pipes 21 is taken, or rejected in favour of the other half, depending on whether the sample shows a failed fuel pin signal. Fractions, or cuts, other than a half could be used. This "halfing" or "cutting" can give a quick detection of the faulty individual sample. Typically one faulty sample out of 584 samples can be identified in nine cuts.

Arrested or zero flow through electromagnetic pumps is generally undesirable as overheating may arise. With the present invention the arrested flow in the pipes 21 is quite acceptable as flow continues through the annuli 14 of the pumps and external to the pipes 21 to effect cooling. A controlled bleed could be given to the pipes 21 to sustain a measure of permanent flow inside the pipes to avoid over-heating.

Another use of pumps as shown in FIG. 1 is described in co-pending application No. 449,526 claiming priority from GB No. 82 00593 of Jan. 8, 1982.

We claim:

1. An electromagnetic pump of the helical linear induction type having a tubular pump housing (10), a cylindrical iron core (16), helical windings (15), an annular flow duct (14), a plurality of sampling pipes (21) which traverse the annular flow duct, an inlet (11) and an outlet (12) for the flow duct, such that electromagnetically pumped flow takes place along paths which lie both inside and outside said sampling pipes (21) where they pass through the pump annulus (14).

2. A vertical cascade of pumps according to claim 1 immersed in a pool of liquid metal in which the sampling pipes traverse selected pumps of the cascade and by-pass others and in which pumping inside the sampling pipes (21) is upwardly against a head greater than that presented by the level (41) of the pool whereby flow in any of the pipes can be created by appropriate energisation of selected pumps.

3. A cascade as claimed in claim 2 in which the pipes discharge into a collector (39) at which the discharge can be tested for products indicative of flow in the pipes from failed nuclear fuel.

* * * * *